UNITED STATES PATENT OFFICE.

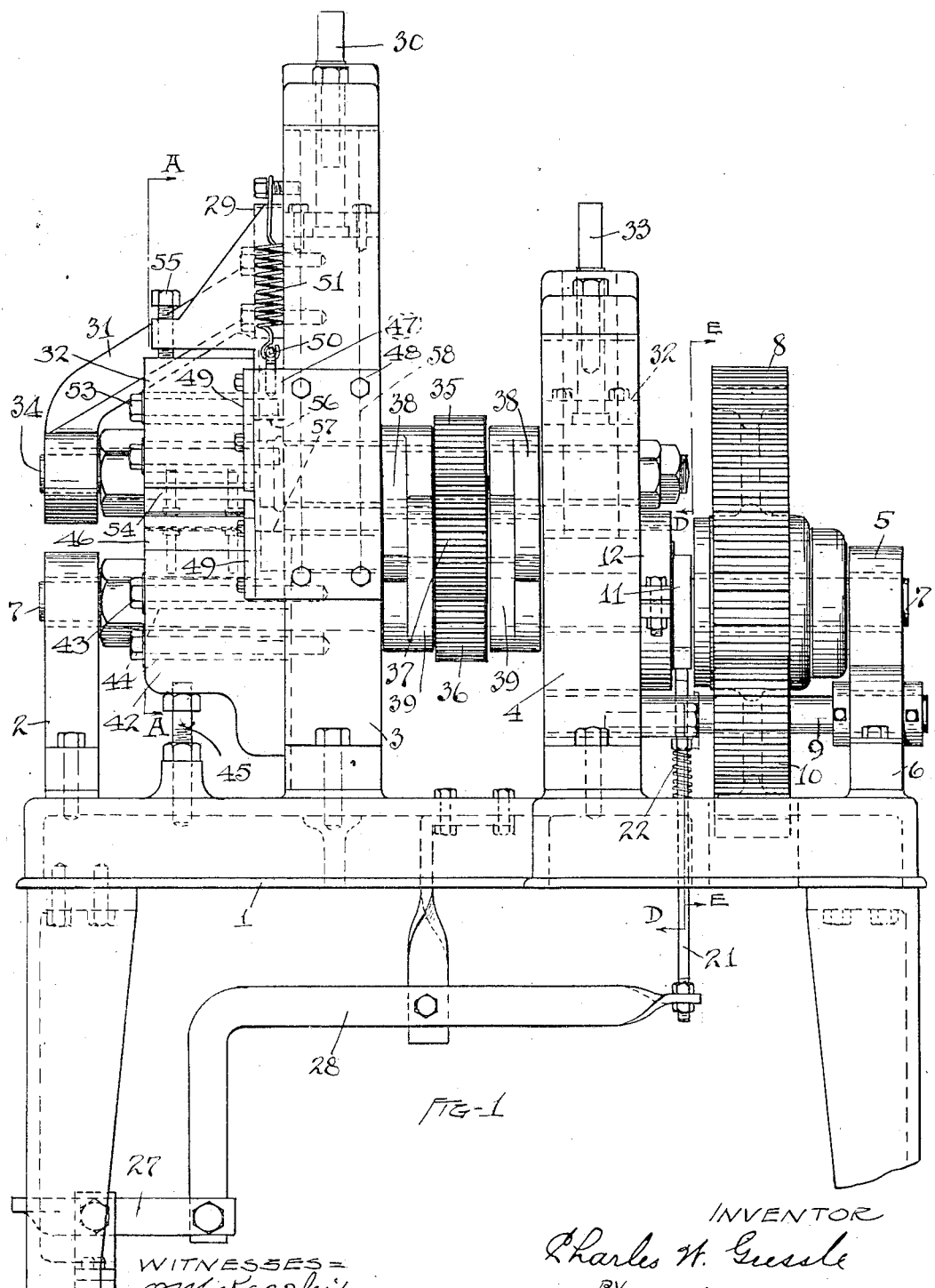

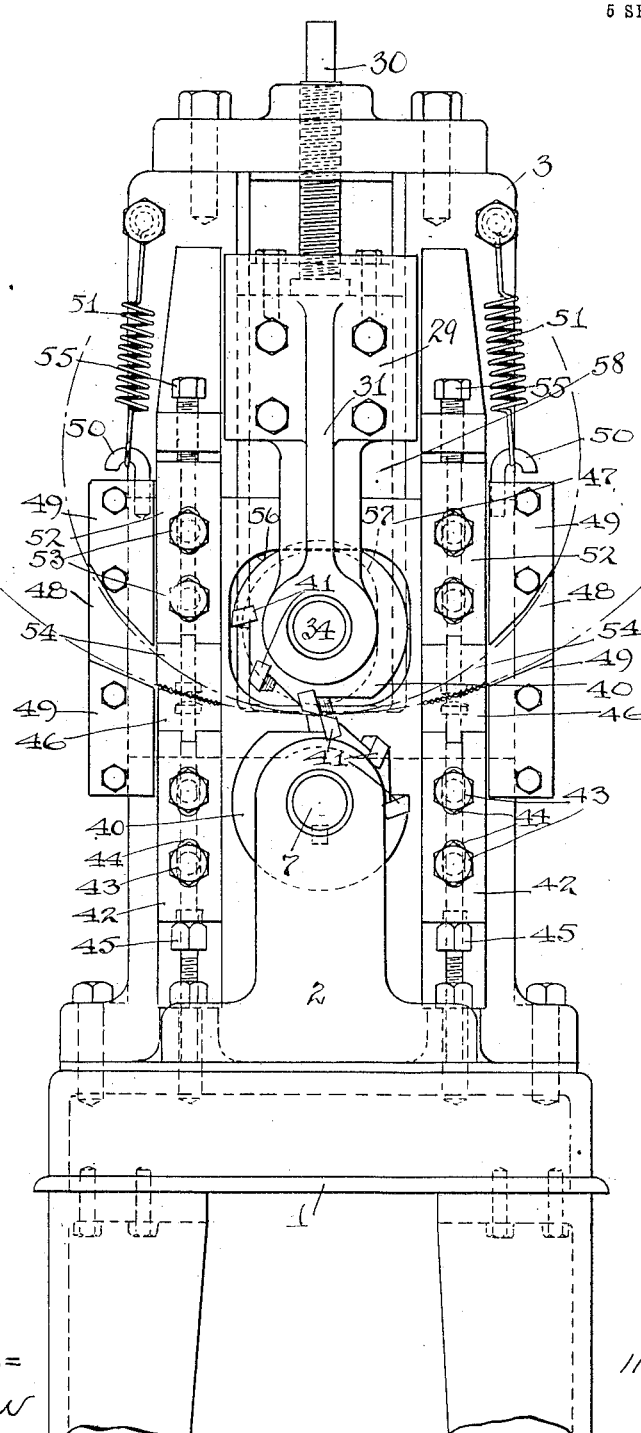

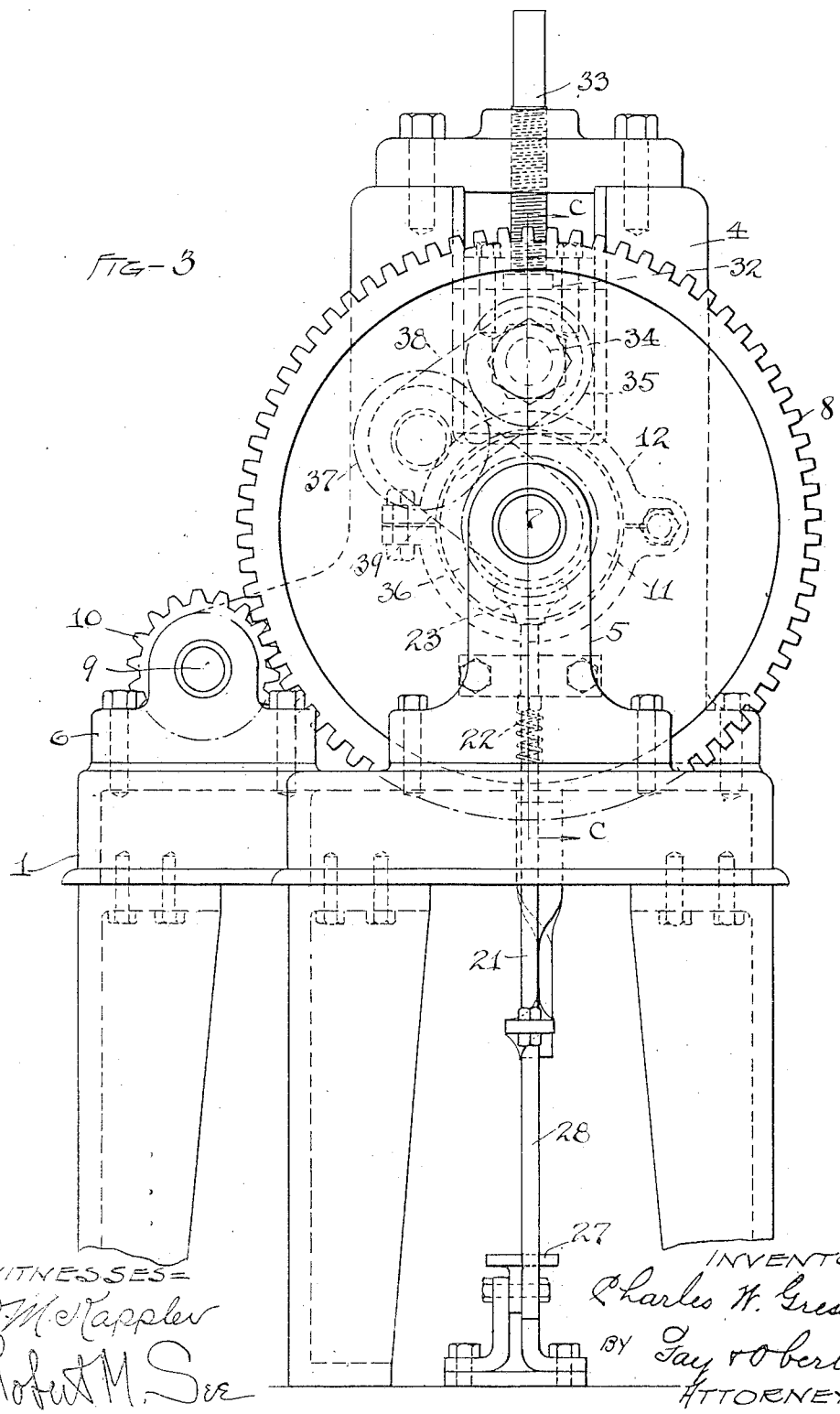

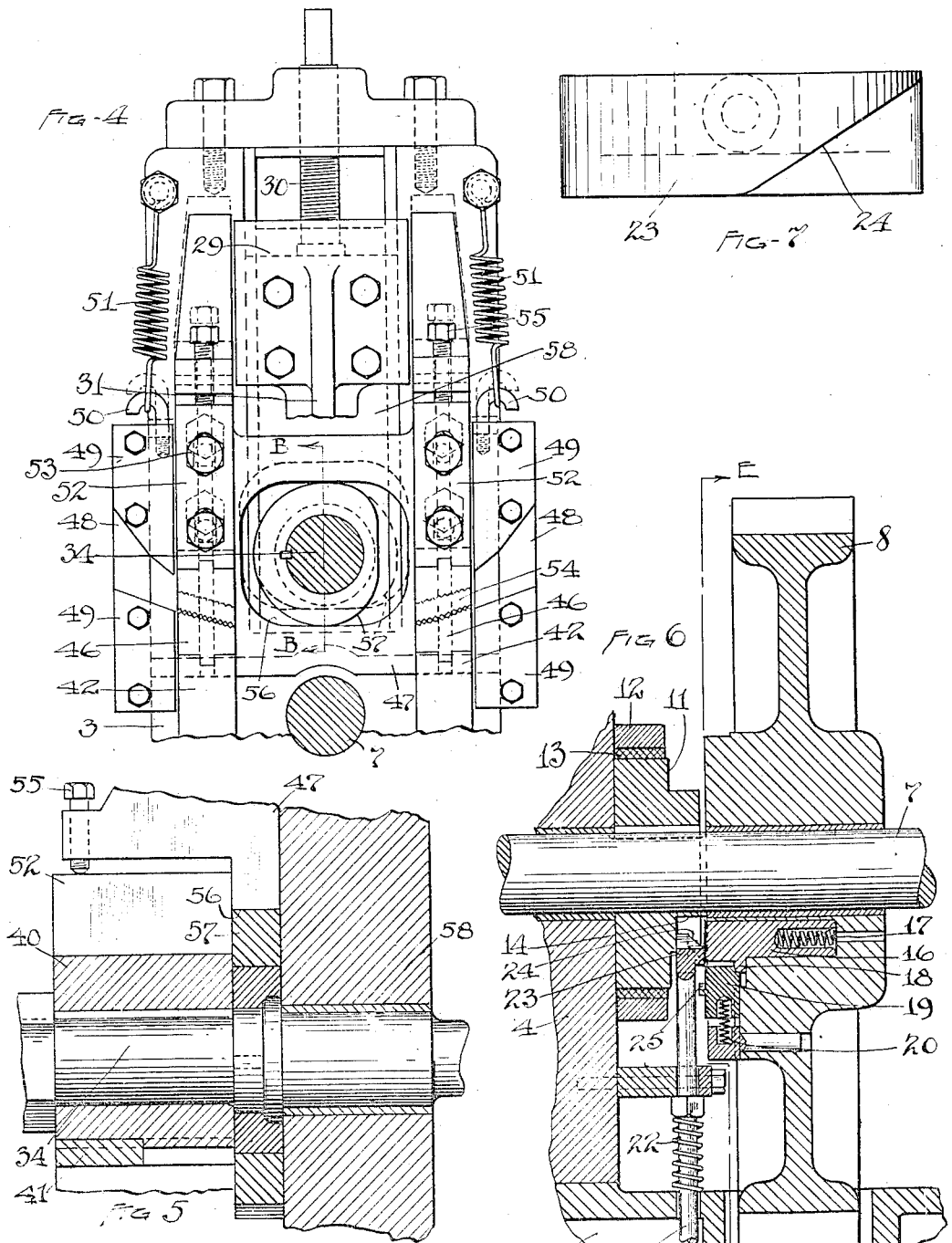

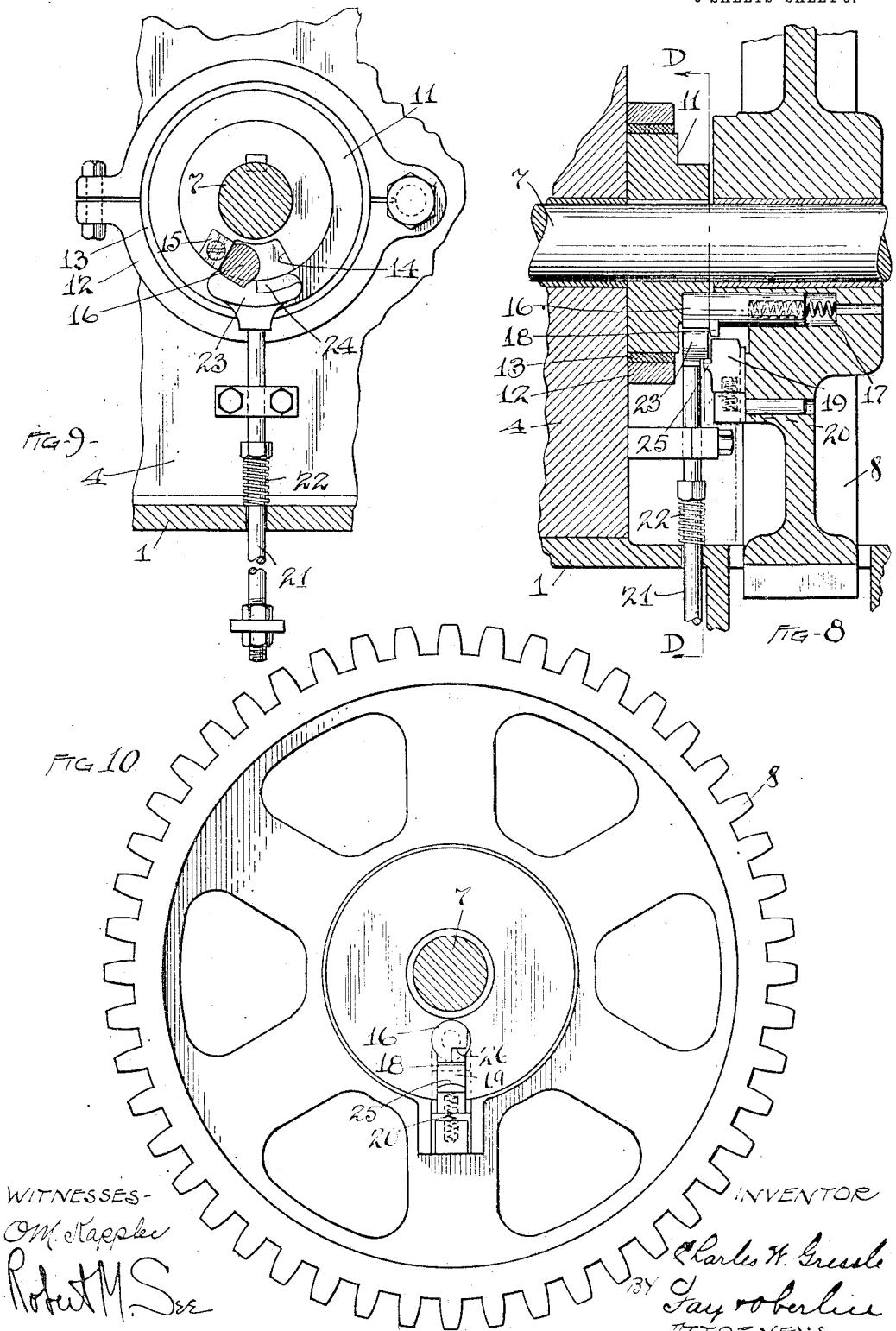

CHARLES W. GRESSLE, OF CLEVELAND, OHIO, ASSIGNOR TO THE STANDARD WELDING COMPANY, OF CLEVELAND, OHIO, A CORPORATION OF OHIO.

DEBURRING-MACHINE.

1,117,663.   Specification of Letters Patent.   Patented Nov. 17, 1914.

Application filed March 14, 1914. Serial No. 824,641.

*To all whom it may concern:*

Be it known that I, CHARLES W. GRESSLE, a citizen of the United States, and a resident of Cleveland, county of Cuyahoga, and State of Ohio, have invented a new and useful Improvement in Deburring-Machines, of which the following is a specification, the principle of the invention being herein explained and the best mode in which I have contemplated applying that principle, so as to distinguish it from other inventions.

The present invention provides what may be termed a deburring machine, adapted to expeditiously remove a bur formed on the surface of an article in the process of its manufacture. In the manufacture of metal rims a sheet is rolled into substantially circular form, and the meeting ends are welded together to form the sheet into a seamless rim. The welding process forms burs on both the outside and inside of the rim, and the present invention provides a machine particularly adapted to the removal of these burs. To the accomplishment of this and related objects, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—Figure 1 is a side elevation of a machine embodying the invention; Fig. 2 is a broken front elevation, certain parts being shown diagrammatically, and others being omitted for the sake of clarity; Fig. 3 is a broken rear elevation, certain parts being omitted; Fig. 4 is a broken section on the line A—A in Fig. 1; Fig. 5 is a broken section on the line B—B in Fig. 4; Fig. 6 is a broken section on the line C—C in Fig. 3; Fig. 7 is a top plan view of a plunger; Fig. 8 is a section on the same plane as Fig. 6 with certain parts in different operative positions; Fig. 9 is a broken section on the line D—D in Figs. 1 and 8; and Fig. 10 is a broken section on the line E—E in Figs. 1 and 6.

The machine comprises a frame which includes a bed 1 and a series of upright members 2, 3, 4, 5 and 6. A shaft 7 is journaled in the frame uprights 2, 3, 4 and 5, and a gear 8 is loosely mounted on the shaft near its rear end. A shaft 9 is journaled in the uprights 4 and 6 and is designed to bear a drive pulley (not shown), and also bears a gear 10 meshing with and adapted to drive the gear 8. A disk 11 is keyed on the shaft 7 and is surrounded by a two-part brake-band 12 which, in the usual manner, may be tightened to compress a packing ring 13 upon the disk and thus vary the friction under which the shaft runs. The disk is provided on its rear face with a recess 14 at one side of which is secured a hardened block 15. A pin 16 is axially slidable in a recess in the front face of the gear 8, and a spring 17 tends to force the pin forwardly. The pin 16 bears a projection 18, the outer face of which is engaged by a catch 19 slidably secured to the front face of the gear 8 and pressed inwardly by a spring 20, so that when the pin 16 is forced rearwardly and the catch 19 is forced upwardly, the pin will be retained in its rearward position in the gear. A plunger 21 is vertically reciprocable in the frame and is pressed upwardly by a spring 22. The plunger may be drawn downwardly by pedal lever 27 and bell lever 28, and during its downward movement the head 23 of the plunger strikes a projection 25 on the catch 19 and pulls the catch downwardly, thus releasing the pin 16 which springs forwardly into the recess 14 in the disk 11. Since the gear 8 is being rotated constantly, when power is applied, the pin 16 engages the hardened block 15 on the disk and thus is clutched to the shaft 7 and causes it to revolve. The operator having removed the pressure from the tread pedal as soon as it was depressed, the plunger 21 springs upwardly again, and near the end of the first revolution of the shaft a slight cam face 26 on the end of the pin 16 rides along the cam face 24 formed on the rear side of the head of the plunger 21, and the pin is thereby forced back into the gear, and the catch 19 thereupon springs upwardly into engaging position, and revolution of the shaft ends with its one revolution.

A head 29 is supported in the central opening of the frame upright 3 by a screw 30 threaded through the cap of the upright, the head 29 bearing a forwardly extending bracket 31. A similar head 32 is similarly mounted in the frame upright 4, and a shaft 34 is journaled in the bracket 31, a block 58 secured to the head 29, and the head 32. The shaft 34 may be raised or lowered by adjusting the screws 30 and 33 to raise or lower the heads 29 and 32. A gear 35 is fixed on the shaft 34; a gear 36 is fixed on the shaft 7; and the gears 35 and 36 both mesh with a gear 37 carried by a pair of arms 38 pivotal about the axis of the shaft 34, and a pair of arms 39 pivotal about the axis of the gear 36. Consequently the lower shaft may rotate the upper shaft in the same direction irrespective of the adjusted position of the upper shaft. Each of the shafts 7 and 34 bear near their front ends carriers 40 in which are removably secured cutters 41. Each carrier may carry one or a plurality of cutters, and the drawings illustrate each carrier provided with a series of three cutters, each of which is set at an angle so that in operation the two cutters coöperating at a given time have a shearing effect. When a series of cutters is mounted on each carrier, each successive cutter in the two series is disposed at a greater radial distance from the axis of the shaft than the preceding cutter, the cutters in the two series being correspondingly mounted.

A pair of holders 42 are bolted to the frame upright 3 by bolts 43 extending through slots 44 so that the holders may be vertically adjusted by means of adjusting nuts 45 when the bolts 43 are loosened. Supporting jaws 46 are removably secured to the upper ends of the holders 42.

A slide 47 bears against the front face of the frame upright 3 and the block 58, and its side edges bear against blocks 48 which are bolted to the sides of the frame upright 3. Plates 49 are bolted to the fronts of the blocks 48 so that in assembled condition the edges of the slide 47 fit in grooves formed by the frame upright 3, the blocks 48, and the plates 49. In the upper end of each edge of the slide is a hook 50 engaged by a spring 51 secured at its upper end to the frame upright 3 and tending to hold the slide in upper position. On the front face of the slide, at its sides, two holders 52 are secured by bolts 53 extending through vertical slots so that the holders may be vertically adjusted. The respective holders carry jaws 54 coöperative with the supporting jaws 46. The holders may be vertically adjusted by adjusting nuts 55. The slide 47 is formed with a central opening 56 within which is disposed a cam 57 fixed on the shaft 34.

In operation the shaft 34 is normally stationary, and the cam 57 is positioned with its flat side down as shown in dotted lines in Fig. 4. The slide is held in upper position by its springs. The operator now rests a rim on the supporting jaws 46 in the position indicated by the dotted line in Fig. 2 and depresses the pedal lever 27. The depression of the lever releases the clutch mechanism whereby the gear 8 drives the shaft 7, and as the shaft starts to rotate, and thereby rotates the shaft 34, the cam 57 immediately depresses the slide 47 and brings the jaws 54 down to clamp the rim against the supporting jaws 46. Immediately after the rim, or other work, is clamped between the two pairs of jaws, the two coöperative cutters on the upper and lower shafts move in opposite directions along the opposite faces of the rim and shear from the rim the projecting burs which were previously formed on both faces of the rim. It may, under certain conditions, be desirable not to inflict upon one pair of cutters the work of entirely removing the burs, and in that event a series of cutters may be provided on each carrier, each successive cutter in the respective series being at correspondingly greater radial distances from the axes of the shafts, so that the first pair of cutters will remove part of the burs and the successive operation of the following pairs of cutters will complete the removal. As the shafts near the completion of their first revolution the flat side of the cam is again faced downwardly so that the springs can pull the slide upwardly. At the same time the clutch mechanism disengages the gear 8 from its driving connection with the disk 11, and revolution of the shafts ceases. The machine is then ready to receive another rim and to repeat the operation.

I therefore particularly point out and distinctly claim as my invention:—

1. In a machine of the class described, the combination of a support; a clamp coöperative with the support to secure a piece of work in position thereon; two parallel shafts disposed on opposite sides of the support and provided with coöperative cutters; mechanism for revolving the shafts in the same direction; and means for operating the clamp.

2. In a machine of the class described, the combination of a support; a clamp reciprocable toward and from the support; two parallel shafts disposed on opposite sides of the support and provided with coöperative cutters; mechanism for revolving the shafts in the same direction; and means for periodically reciprocating the clamp.

3. In a machine of the class described, the combination of a frame; a support secured thereto; a plate slidably secured to the frame; a clamp secured to the plate and coöperative with the support; two parallel shafts disposed on opposite sides of the support and provided with coöperative cutters; mechanism for revolving the shafts in the same direction; a cam on one of the shafts engaging the plate and proportioned to periodically advance the plate; and means tending to restrain advancement of the plate.

4. In a machine of the class described, the combination of a frame; a support adjustably secured thereto; a plate slidably secured to the frame; a clamp adjustably secured to the plate and coöperative with the support; two parallel shafts disposed on opposite sides of the support and provided with coöperative cutters; adjustable mechanism for revolving the shafts in the same direction; a cam on one of the shafts engaging the plate and proportioned to periodically advance the plate, such shaft being adjustable toward and from the other shaft; and means tending to restrain advancement of the plate.

5. In a machine of the class described, the combination of a frame; two laterally spaced, vertically adjustable, supports secured thereto; a plate secured to the frame and vertically slidable thereon; two laterally spaced, vertically adjustable, clamps secured to the plate and respectively coöperative with the supports; two horizontal shafts disposed respectively above and below the supports and between the clamps and supports, the shafts being provided with coöperative cutters, and the upper shaft being vertically adjustable; adjustable mechanism for revolving the shafts in the same direction; a cam on the upper shaft engaging the plate and proportioned to periodically lower the plate; and a spring tending to restrain lowering of the plate.

6. In a machine of the class described, the combination of a frame; a support secured thereto; a plate slidably secured to the frame; a clamp secured to the plate and coöperative with the support; two parallel shafts disposed on opposite sides of the support and provided with coöperative cutters; a revoluble gear loose on one of the shafts; a clutch for securing the gear to the shaft; mechanism for automatically disengaging the clutch on completion of one revolution of the shaft; gearing connecting the last-named shaft to the other shaft to revolve the latter in the same direction; a cam on one of the shafts engaging the plate and proportioned to periodically advance the plate; and means tending to restrain advancement of the plate.

7. In a machine of the class described, the combination of a frame; two laterally spaced, vertically adjustable, supports secured thereto; a plate secured to the frame and vertically slidable thereon; two laterally spaced, vertically adjustable, clamps secured to the plate and respectively coöperative with the supports; two horizontal shafts disposed respectively above and below the supports and between the clamps and supports, the shafts being provided with coöperative cutters, and the upper shaft being vertically adjustable; a revoluble gear loose on the lower shaft; a clutch for securing the gear to the shaft; mechanism for automatically disengaging the clutch on completion of one revolution of the shaft; adjustable gearing connecting the lower shaft to the upper shaft to revolve the latter in the same direction; a cam on the upper shaft engaging the plate and proportioned to periodically lower the plate; and a spring tending to restrain lowering of the plate.

Signed by me, this 12 day of March, 1914.

CHARLES W. GRESSLE.

Attested by—
H. E. BUTCHER,
J. C. MANTEMACK.